United States Patent
Henrichsen et al.

(10) Patent No.: US 11,759,894 B2
(45) Date of Patent: Sep. 19, 2023

(54) METHOD FOR PRODUCING A WIND TURBINE BLADE

(71) Applicant: Siemens Gamesa Renewable Energy A/S, Brande (DK)

(72) Inventors: Soeren Randrup Daugaard Henrichsen, Vodskov (DK); Mogens Nielsen, Aalborg (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 17/339,269

(22) Filed: Jun. 4, 2021

(65) Prior Publication Data
US 2021/0387294 A1 Dec. 16, 2021

(30) Foreign Application Priority Data

Jun. 12, 2020 (EP) .................................. 20179656

(51) Int. Cl.
*B23P 15/04* (2006.01)
*F03D 1/06* (2006.01)

(52) U.S. Cl.
CPC ............ *B23P 15/04* (2013.01); *F03D 1/0675* (2013.01); *F05B 2230/20* (2013.01); *F05B 2240/30* (2013.01)

(58) Field of Classification Search
CPC .... B23P 15/04; F03D 1/0675; F05B 2230/20; F05B 2240/30; B29C 70/86; B29C 45/03; B29C 35/02; B29C 45/26; B29D 99/0028
See application file for complete search history.

(56) References Cited

U.S. PATENT DOCUMENTS

| 8,221,085 | B2 | 7/2012 | Livingston et al. |
| 9,920,630 | B2* | 3/2018 | Dahl ..................... F03D 1/0675 |
| 11,131,290 | B2* | 9/2021 | Pal ......................... F03D 1/0675 |
| 2011/0198013 | A1 | 8/2011 | Christiansen et al. |
| 2015/0010406 | A1* | 1/2015 | Torgard .................. B23P 15/04 |
| | | | 29/889.7 |
| 2016/0108736 | A1 | 4/2016 | Schuring |

(Continued)

FOREIGN PATENT DOCUMENTS

| EP | 2264310 A2 | 12/2010 |
| EP | 2591230 A2 | 5/2013 |
| EP | 2740583 A1 | 6/2014 |

(Continued)

OTHER PUBLICATIONS

European Search Report and Written Opinion of the European Searching Authority dated Nov. 4, 2020 for Application No. 20179656.2.

*Primary Examiner* — Ryan J. Walters
(74) *Attorney, Agent, or Firm* — Schemeiser, Olsen & Watts LLP

(57) ABSTRACT

Provided is a method for producing a wind turbine blade having a blade body including a body part and a tip part, the blade being produced by using a mold, wherein a prefabricated tip part having a first connection interface is arranged adjacent to the mold for producing the body part, whereby building elements for building the body part are arranged in the mold providing a second connection interface which corresponds to and connects to the first connection interface, whereafter both connection interfaces are fixed by applying a fixing agent and curing it.

8 Claims, 4 Drawing Sheets

(56) References Cited

U.S. PATENT DOCUMENTS

2022/0032562 A1\* 2/2022 Smith ................... F03D 1/0675

FOREIGN PATENT DOCUMENTS

| EP | 3112672 A1 | 1/2017 |
| GN | 102205575 A | 10/2011 |
| WO | 2010037762 A1 | 4/2010 |
| WO | 2020078519 A1 | 4/2020 |

\* cited by examiner

METHOD FOR PRODUCING A WIND TURBINE BLADE

CROSS-REFERENCE TO RELATED APPLICATIONS

This application claims priority to EP Application No. 20179656.2, having a filing date of Jun. 12, 2020, the entire contents of which are hereby incorporated by reference.

FIELD OF TECHNOLOGY

The following relates to a method for producing a wind turbine blade having a blade body comprising a body part and a tip part, the blade being produced by using a mold.

BACKGROUND

Wind turbines are commonly known. They comprise a tower and a nacelle arranged on top of the tower. The nacelle comprises a hub, to which several, usually three rotor blades are attached. They interact with blowing wind making the hub rotate. The hub is coupled to an electric generator for producing electric power, as commonly known.

A wind turbine blade respectively a rotor blade is a hollow construction with an elongated blade body having a root section usually of cylindrical shape, by which it is attached to the hub. The root section is followed by the long blade body section, which changes its shape significantly from the root to the tip, as it merges from the cylindrical cross-section at the root section to an airfoil cross-section, which then runs to the tip.

Such a blade is built of several blade building elements comprising among others fiber plies or laminates, wooden or polymer core elements or a web with spar caps etc. These building elements are embedded in a resin matrix. Usually, two different ways of manufacturing the turbine blade are known. In a first alternative, the blade comprises two shells, i.e. an upper and a lower shell, which are manufactured separately in respective molds and which are then attached to each other for finally building the blade. Each half shell, which may also be seen as a blade building element, extends from the root to the tip. In a second alternative, the blade is manufactured in a one-shot procedure. In this procedure, all separate building elements for producing the whole blade, like the already mentioned fiber plies or laminates, the core elements, the webs and spar caps etc., are placed in a respective shell, which is part of the mold, with one or several mandrels being inserted in this construction for filling the inner space of this construction to avoid resin entering and filling the hollow inner of the blade. When all separate elements are arranged, the construction is set under vacuum and the resin is infused, so that all elements are embedded in the resin matrix in a single shot.

For producing such a wind turbine blade, no matter if it is produced with separate upper and lower shells, or in a one-shot procedure, the blade design especially in view of the length of the blade is usually specified at an early stage of the development of the turbine on a non-mature design applying certain design uncertainty factors. Based on this early frozen design, the geometry of the mold for the half shells or the one-shot procedure is determined, which mold is then manufactured defining the final blade geometry. Such a mold is, in view of the length of the blade, a very complex and especially long construction, which needs to be designed to carry the relatively high load of the finally produced blade or blade part. The mold design is adapted to the blade design. For each specific blade design a separate mold needs to be built. However, during the long-lasting development, the blade design may be adapted and change both with regard to its design and maybe the specific loads. It may therefore be possible that the blade design changes especially regarding the blade length. This however entails problems with the previously determined mold concept, as the mold is already produced. The mold then needs to be cut and new mold pieces need to be built and inserted to provide a mold with the updated geometry. For this reason, the length of the blade is usually not changed.

SUMMARY

An aspect relates to provide an improved method for producing a wind turbine blade.

For addressing the problem, embodiments of the invention proposes a method for producing a wind turbine blade having a blade body comprising a body part and a tip part, the blade being produced by using a mold, which method is characterized in that a pre-fabricated tip part having a first connection interface is arranged adjacent to the mold for producing the body part, whereby building elements for building the blade body part are arranged in the mold providing a second connection interface which corresponds to and connects to the first connection interface, whereafter both connection interfaces are fixed by applying a fixing agent and curing it.

Embodiments of the invention propose a method, in which the main part of the blade, i.e. the body part comprising the root section and the body section, is manufactured in the mold by arranging respective building elements in the mold. This body part set-up may be realized in different ways, to which will be referred later. Accordingly, only a part of the whole blade is manufactured in the mold. The other part, i.e., the tip part, is a pre-fabricated hollow blade part, which is produced with its specific design in a separate mold, which mold is exactly designed to the requested tip part design. This pre-fabricated tip part, which can be fabricated in advance of the arrangement of the body part building elements in the mold or parallel to this process, is then transported and positioned adjacent to the blade body part mold and brought in a specific position relative to the body part building elements. For connecting the pre-fabricated tip part and the body part respectively the building elements, the pre-fabricated tip part has a first connection interface and the body part respectively the building elements have or provide a second connection interface. Both connection interfaces correspond to each other in their geometry, so that a kind of form-fit connection is possible. In the final arrangement, the first connection interface connects to the second connection interface. For finally connecting the pre-fabricated tip part with the respective building elements of the body part and therefore finally with the body part itself, a fixing agent is applied at least to and in the area of both connection interfaces for firmly connecting the respective blade parts.

The inventive method allows for changing the blade design, especially in regard of the blade length, also at a later stage of the development without the necessity to make major changes in the overall blade mold. Due to the split concept, according to which a pre-fabricated tip part is used, while the main blade body part is separately produced, it is possible to build the mold for the blade body part, as usual, at a very early stage of the development, as the design of the blade body part usually does not change. Only a change in the design of the tip part, especially the length of the tip part, is sometimes necessary or appropriate in view of any design changes. For this specific tip part design, a separate, small mold is then produced, when the final tip part design is at hand, allowing for the production of the specifically needed tip part, which is then connected to the body part in various ways, which will be described later.

It is therefore possible to use one and the same mold for producing the blade body part of a series of various blade designs, which all have the same body part in common, but which are different in regard of the tip part design. So, it is possible to build only one main body part mold for producing the body part for the various blades, while for each specific blade type a specific, small tip part mold is produced. The proposed manufacturing concept decreases the time between manufacturing of different blade variations, due to the use of a standardized mold respectively a standardized blade body part and individual tip parts. A family of blades may therefore be designed and manufactured simultaneously, as the same body part design is used throughout the whole blade family, produced in the standardized mold, and only the tip parts are individually designed and produced. Furthermore, this allows for developing more site-specific blades and even turbine specific blades, as the tip part can be customized for the given condition. Therefore, the inventive concept with a standardized blade body part, which can also be referred to as an inboard part, having a standardized second connection interface, and the individualized tip part, which can also be referred to as an outboard part also having a standardized connection interface, allows for a high variation in the manufacturing and design process. It is easily possible to adjust the length of the final blade, as far as the loadings allow.

A major feature of the concept is the fact, that corresponding connection interfaces are provided at the pre-fabricated tip part and the body part, i.e. the first and the second connection interface, which correspond to and connect to each other. Both connection interfaces comprise slanted connection interfaces for realizing a scarf joint, whereby the connection interfaces overlap. The tip part for example has at its inner end, which is connected to the body part, a slanted connection face, which ramps down from the outside to the inside, so that a slanted connection interface, which extends around the whole circumference of the tip part end, can be arranged in the form-corresponding second connection interface provided by the building elements, which second connection interface ramps up from the inside to the outside, so that this body part connection area overlaps the tip part connection area in a form-fit manner, with the slanted or ramped faces being adjacent or in contact with each other, and which are then finally and firmly fixed to each other by the cured fixing agent. Using slanted connection faces respectively realizing a scarf joint allows for a very smooth but relatively long transition and connection area, which allows for a very firm connection.

The slanted faces are provided at a shell of the tip part and by the building elements building a shell of the body part. The tip part as well as the final body part comprise a respective shell, which, as commonly known, is hollow, and in which the respective webs and spar caps and core elements etc. are arranged. These shells are usually made of fiber plies or fiber laminates, made of glass fibers or carbon fibers or a combination of both types. These webs or laminates are usually resin-infused. During manufacture of the tip part and the respective body part the respective fiber plies or laminates are arranged in the respective mold. For realizing the respective connection interfaces, they are arranged such that in the final cured state of the pre-fabricated tip part a respective slanted face is realized at the end of the pre-fabricated tip part, and that, depending on the respective final method of producing the body part, either a respective slanted area is built by the respective multi-layered fiber plies or laminates, which is then finally resin-infused, when the tip is already inserted, or, when pre-fabricated shells making the body part are used, that the respective shells comprise respective resin-embedded slanted faces, which will be referred to later on. Realizing these slanted faces in the respective shell area allows for a very large transition and connection area, which extends around the whole circumference of the blade, as already mentioned.

In addition to providing the slanted faces at the respective shell or shell building elements etc., it is also possible, that additional slanted faces are provided at at least one longitudinal web or beam provided in the tip part and at least one longitudinal web or beam building element provided in the body part. As already mentioned, one or more webs with respective spar caps and core elements etc., which have a beam-like shape, extend through the blade and therefore from the body part to the tip part. As both parts are manufactured separately, also a connection between the respective body part and tip part webs or beams is appreciated. Also, this connection can be used for firmly connecting both parts, as also at these webs or beams respective slanted faces may be realized. The respective web or beam parts are axially aligned, so that their slanted faces are adjacent and connect to each other and can finally also be fixed together by the respective fixing agent. So, not only the shells, but also the webs or beams are part of the overall first and second connection interfaces.

As previously mentioned, the pre-fabricated tip part and the body part are produced separately and in separate molds. The body part may, as already mentioned, be manufactured in various ways. According to a first embodiment, the separate building elements of the entire body part are arranged in the mold and are completely infused with the resin used as the fixing agent and are embedded in a resin matrix together with both connection interfaces after curing the resin. According to this first alternative, the body part is completely set up with all its separate building elements in the respective body part mold. All respective fiber plies or laminates, webs, spar caps, core elements etc. are arranged piece by piece in the respective mold in a way, that the second connection interface is provided at the tip side end of the body part, to which second connection interface the first connection interface of the tip part is connected afterwards. When all building elements of the body part are arranged, and when the pre-fabricated tip part is positioned, so that both connection interfaces are in the right position relative to each other, the mold is sealed, so that it can be evacuated. The sealing also covers the area of the connection interfaces, so that also this area may be evacuated, if need be also the entire tip part is included in the sealed area. After sealing the respective area, and after evacuating it, a liquid resin is infused, which completely embeds all blade body part building elements and also the connection area respectively both connection interfaces, so that all building elements and the connection area is completely infused and embedded in the resin. Afterwards, the resin is cured, so that all building elements and the connection interfaces are embedded in a respective hardened resin matrix, which stabilizes the whole setup and which also provides for an extremely firm connection of the tip part to the now stable, cured body part.

The transition from the tip part to the body part is realized by the respective transition area in the connection area. In this area, both the tip part and the body part have a respective shell, which is built by the respective fiber plies and laminates infused in the respective resin matrix, as also the tip part certainly has a resin matrix embedding the tip part building elements like the fiber plies or laminates, webs, spar caps etc., so that a very stable transition area, which is in its setup completely equivalent to the adjacent respective shell areas, is realized.

This first alternative of the inventive method may further be characterized by the following steps:
- arranging building elements in form of fiber plies or laminates for building the body part shell in a lower mold half such, that they provide a first part of the second connection interface,
- arranging the tip part such, that it connects with at least a part of its first connection interface to the first part of the second connection interface,
- arranging further building elements, especially at least one web and/or beam in the mold half, especially with their further parts of the second connecting interface connected to a further part of the first connection interface provided by at least one web or beam of the tip part,
- arranging the building elements for building the body part shell such, that they cover the further building elements and provide a second part of the second connection interface connecting to a further part of the first connection interface,
- closing the mold by placing an upper mold half on the lower mold half,
- applying a liquid resin as a fixing agent for embedding at least the shell building elements and the first and second connection interfaces in the resin and curing the resin.

The blade building elements building the body part are arranged step by step in the mold. At first, as they build the overall outer shell, fiber plies or fiber laminates are arranged in the lower mold half. They are arranged over the whole length of the mold half and are arranged at the tip side end such, that they provide a first part of the second connection interface, a slanted connection face or area. This is easily possible, as a number of webs or laminates are stacked, which can be staggered or scaled in an axial direction realizing a ramped or slanted area, which realizes a first part of the second connection interface.

Thereafter, the pre-fabricated tip part is arranged such, that the lower part of its first connection interface realized at the outer side of the shell of the tip part is connected to the part of the second connection interface realized by the respective fiber plies or laminates. The tip part is for example positioned vertically over this end part of the fiber plies or laminate stack and then lowered, so that both slanted areas overlap, seen in an axial direction.

After positioning the tip part, the respective web or beam like the core elements etc. as building elements for the body part are arranged in the mold and, if they are also part of the second connection interface, they are aligned and positioned relative to the connection interfaces at the web or beams of the tip part.

Now, the fiber plies or fiber laminates of the body part are wrapped over the web or beam etc., so that they build the upper fiber plies or fiber laminate stack for the upper side of the shell, enclosing or enveloping all webs or beams etc. in the inner. Thereby, also the second part of the second connection interface is realized and is overlapped over the upper side of the first connection interface, which therefore is also covered or enveloped.

As now all building elements for the body part are arranged in the mold, the mold is closed by placing an upper mold half on the lower mold half. The mold arrangement is sealed, which sealing, as mentioned, also covers or extends at least over the connection area, whereafter a vacuum is applied. Now, a liquid resin used as a fixing agent is applied, which embeds the shell building elements and the first and second connection interfaces, and which is finally cured to build the resin matrix.

In a further embodiment of this first alternative, at least one mandrel may be arranged as a building element, which mandrel is pulled from the body part into the tip part and is inflated before the building elements for building the body part shell are arranged for covering the further building elements. If such a mandrel is used, it is arranged after the tip part is in position and after the further building elements like the webs, spar caps, beams, etc. are arranged in the mold. These one or maybe two mandrels are pulled from the body part into the tip part and are then inflated, as a mandrel or each mandrel is a kind of airbag having a very distinct shape. It serves two purposes, i.e., for avoiding that any resin flows into the inner of the blade, which has a hollow inner. The mandrels prevent this resin flow. Furthermore, the one or the several mandrels support the arrangement of the fiber plies or laminates, when they are overlapped for covering the webs, beams, spar caps etc., keeping the fiber plies or laminates, but also the webs and spar caps and beams like the core elements etc. in place.

As the tip part is pre-fabricated as a hollow element, and as no resin may fill the hollow tip part structure, it is necessary to arrange respectively extend the one or the several mandrels not only in the body part, but also in the tip part. Therefore, the one or all mandrels are pulled from the body part into the tip part. For pulling them, a pulling means or a puller is connected to the at least one mandrel and is guided through the tip part and a bore in the tip part to the outside of the tip part, which pulling means or puller is pulled through the bore for pulling the mandrel in the tip part. This pulling means or puller, a rope or a chain, allows for an easy handling of the mandrels and for also arranging them in the hollow tip part, where they, when they are inflated, line the inner of the tip part shell avoiding any resin filling the inner of the tip part.

The above-mentioned first method alternative discloses the manufacturing of the body part in a one-shot process, as all body part building elements are separately arranged in the body part mold and, after positioning the tip part, are completely infused in a one-shot resin infusion. Aside this one-shot method, it is also possible to build the body part in the respective mold by using two separate body part half shells, which are separately manufactured, and which are for building the body part arranged above each other and are fixed together by the respective fixing agent, after inserting the respective webs, spar caps, beams or core elements etc. Each body part half shell, which is a blade building element, comprises one part of the second connection interface, i.e., a respective slanted face at the tip side end of the respective half shell, so that, when both half shells are arranged above each other, a complete second connection interface extends around the circumference of the split body part shell in form of a slanted face, which overlaps the slanted first connection interface. For fixing the half shells together and also for fixing the connection interfaces, so that the tip part is firmly connected to both half shells, a respective fixing agent in form of a glue is used. In this embodiment, no resin infusion is necessary, as both half shells are already resin-infused, with all their building elements like fiber plies or fiber laminates, webs, spar caps, core elements etc. being embedded in a respective resin matrix. It is only necessary to firmly glue the half shells together for building the respective blade body part.

This inventive method may therefore be characterized by the following steps:

arranging a molded first body part half shell in a lower mold half, whereby the body part half shell, which is a first building element of the body part, has a first part of the second connection interface, arranging the tip part such, that it connects with at least a part of its first connection interface to the first part of the second connection interface, arranging further building elements, especially at least one web and/or beam in the first body part half shell, especially with their further part of the second connection interface connected to a further part of the first connection interface provided by at least one web or beam of the tip part, arranging a molded second body part shell on the first body part shell, whereby the second body part half shell has a second part of the second connection interface connecting to a part of the first connection interface, closing the mold by placing an upper mold half on the lower mold half, fixing both bod shells and the first and second connection interfaces together, using a glue as a fixing agent, and curing the glue.

Also here, the first and the second connection interfaces may either only be realized by respective slanted faces of the tip part and the respective body part half shells. In addition, also the respective webs and beams or core elements etc. of the tip part and of the final body part may have respective connection geometries, which are also part of the respective first and second connection interface, along which connection geometries the webs, beams etc. are finally connected by using a glue. As here no resin infusion takes place, no mandrels are used and no vacuum is applied.

Instead, a glue is used, which is applied to respective connection surfaces provided at the respective body part half shells and the connection interfaces, which glue is applied to these respective faces when appropriate, for example before the second body part half shell is placed on the lower first body part half shell, while certainly also a glue may be provided, when the respective further building elements like the webs, spar caps, core elements etc. are arranged in the lower body part half shell. Certainly, the glue is provided at the respective stage or time.

Finally, a third manufacturing method is disclosed, which also uses two pre-fabricated body part half shells, with each half shell being a building element of the body part. In this alternative, both body part half shells with the inserted webs, spar caps, beams etc. are already firmly fixed to each other by using a glue, before the pre-fabricated tip part is positioned and connected to the second connection interface of this glued body part. The tip part is brought in alignment with the glued body part, and is then moved axially, so that its first connection interface is inserted into the second connection interface or vice versa. Certainly, a respective glue is already applied on the respective connection interfaces, so that after reaching its final position, the glue may be cured and the pre-fabricated tip part is firmly connected to the glued body part.

This method may be characterized by the following steps:

arranging a molded first body part half shell in a lower mold half, whereby the body part half shell has a first part of the second connection interface, arranging further building elements, especially at least one web and/or beam in the first body part half shell, arranging a molded second body part half shell on a first body part half shell, whereby the second body part half shell has a second part of the second connection interface, fixing both body part shells together by using a glue, arranging the tip part such, that it connects with its first connection interface to the second connection interface, and especially with their further part of the first connection interface provided by at least one web or beam of the tip part connected to a further part of the second connection interface provided by the at least one web and at least one beam, if need be, closing the mold by placing an upper mold half on the lower mold half, fixing the first and second connection interfaces together by using a glue as a fixing agent applied to both connection interfaces and curing the glue.

If webs or core elements etc. are arranged both in the tip part and the body part, also these webs or beams etc. may have respective parts of the first and second connection interfaces. Therefore, when the tip part is aligned and positioned relative to the glued body part, also the respective webs or beams of both the tip part and the body part are axially aligned with their respective connection interface parts being connected and fixed together by using the glue.

While the first alternative is a one-shot method, the second and third alternative are a so-called "butterfly"-technology. In this technology, usually a mold is used, which has a first mold for building the first body part half shell and a second mold for building the second body part half shell. Both molds are hinged together. For arranging the second body part half shell on top of the first body part half shell the mold comprising the second body part half shell is swiveled around the hinge connection, so that the second body part half shell, which is fixed in the mold by a vacuum suction, is swiveled over the first body part half shell, whereafter they are fixed in the various described ways.

Beside the inventive method, embodiments of the invention also refer to a wind turbine blade manufactured by a method as described above.

BRIEF DESCRIPTION

Some of the embodiments will be described in detail, with reference to the following figures, wherein like designations denote like members, wherein.

Figure 7:
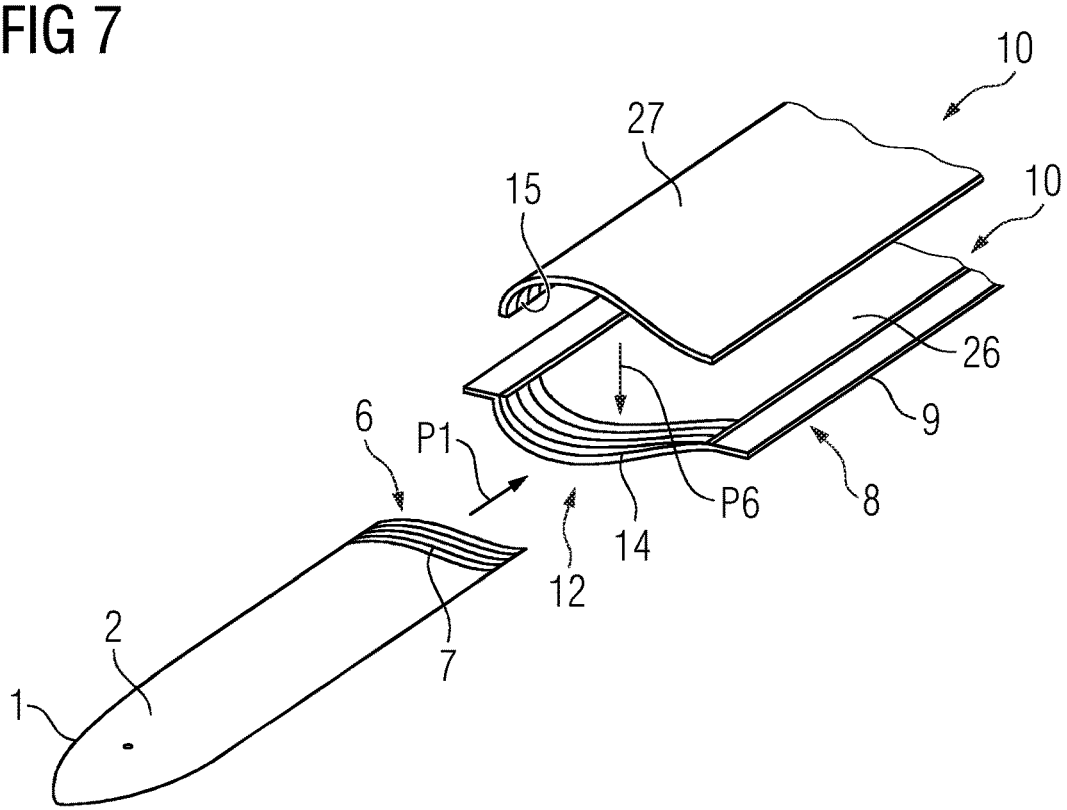
Figure 8:
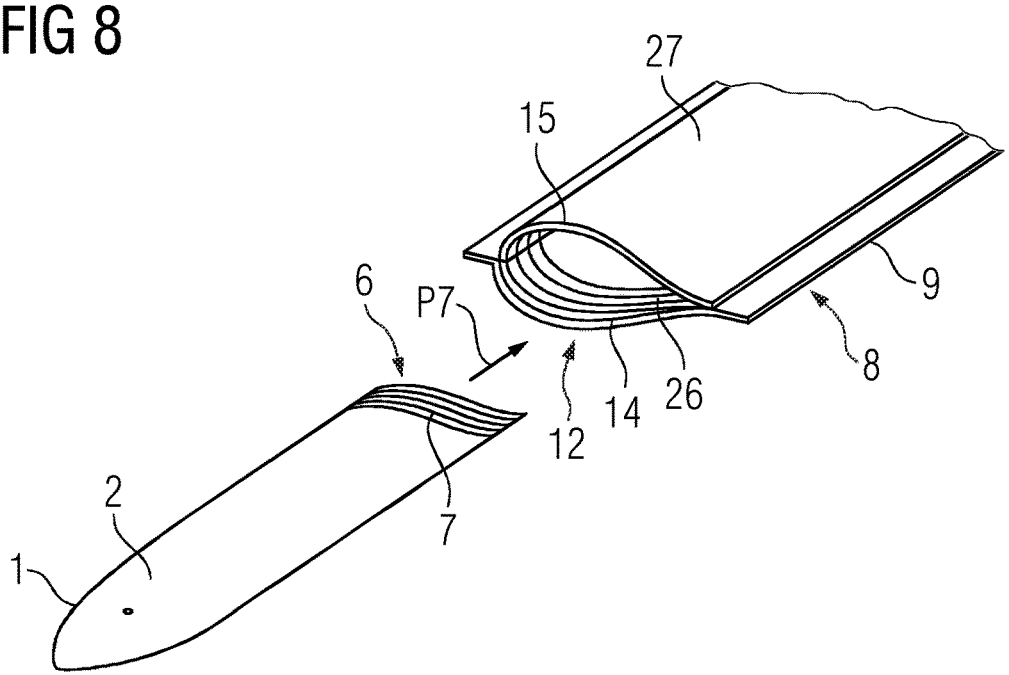

FIG. 7 shows a principal illustration of the second method alternative, where two body part half shells are used, and where the tip part is positioned relative to the first body part half shell, whereafter the second body part half shell is positioned and fixed; and FIG. 8 shows a principal illustration of a third method alternative, using two body part half shells, which are fixed to each other, whereafter the tip part is positioned and fixed.

DETAILED DESCRIPTION

FIGS. 1-4 show consecutive illustrations regarding a first method alternative, where the separate blade body building elements are arranged in a blade body mold and a pre-fabricated tip part is arranged and attached. This method is a one-shot method, where the blade body building elements are embedded in a resin matrix by resin infusion, while also the connection of the tip part 1 is realized by the resin infusion.

Figure 1:
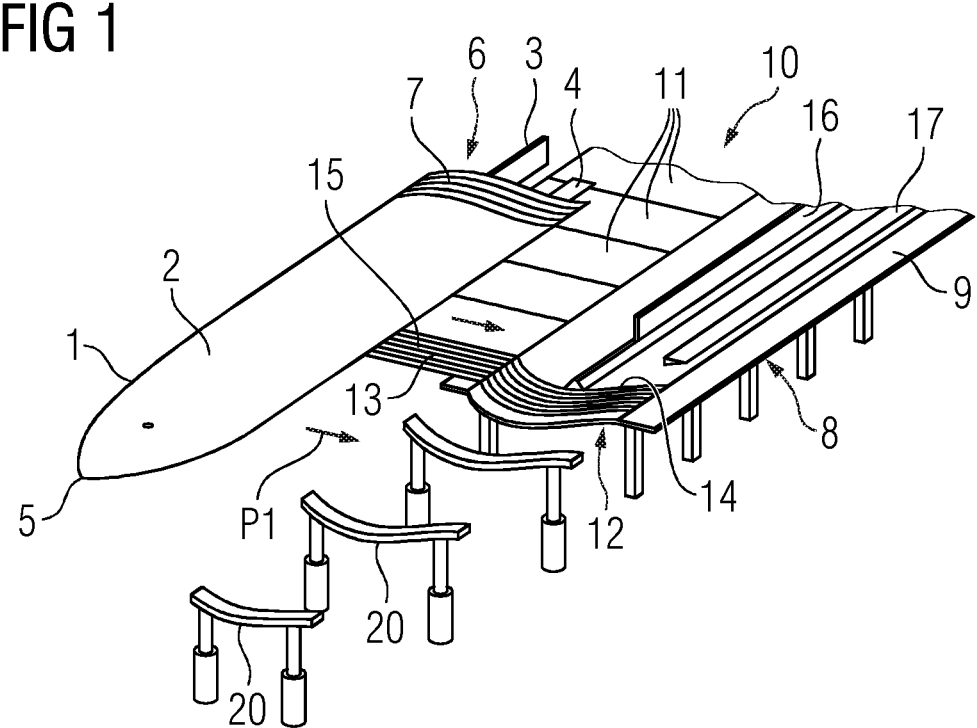
FIG. 1 shows a step of the first method alternative where the separate building elements of the blade body are arranged in the mold and a resin infusion is performed.
Figure 2:
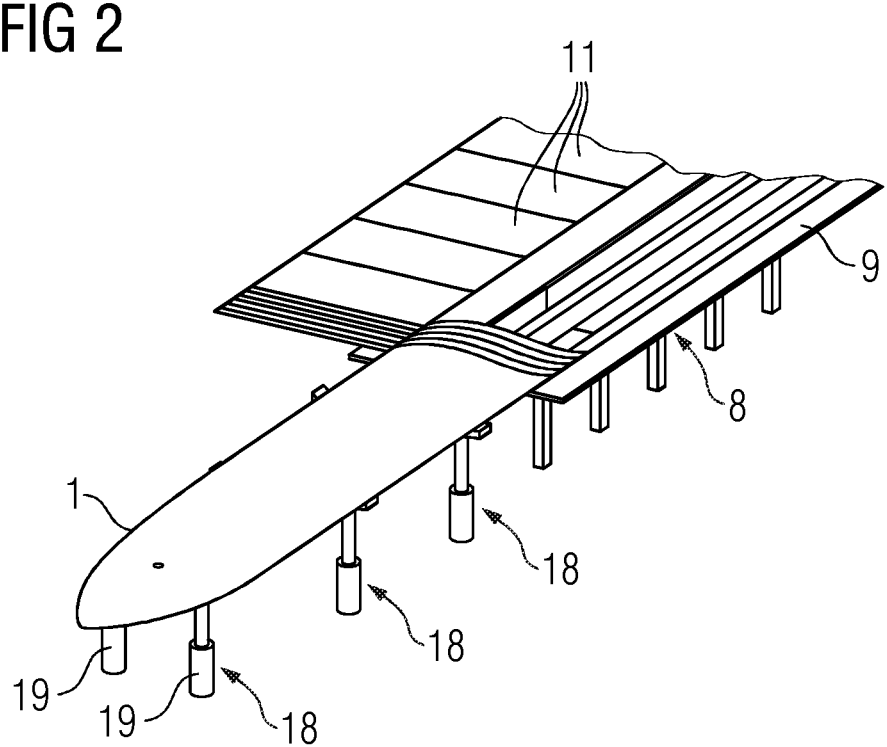
FIG. 2 shows another step of the first method alternative where the separate building elements of the blade body are arranged in the mold and a resin infusion is performed.

FIG. 1 shows a pre-fabricated tip part 1 comprising a shell 2, which is built of fiber ply or fiber laminate layers stacked above each other and embedded in a resin matrix. At least one web 3 with respective spar caps is arranged in the shell 2 and connects the upper shell side to the lower shell side, and at least one beam 4, which may be a core element, for example made of wood like balsa wood or a polymer etc. is also arranged and embedded in the resin matrix. As FIG. 1 shows, they extend over the end of the pre-fabricated tip part 1.

At the end opposite to the tip 5, a first connection interface 6 is provided in form of a slanted face 7, which extends around the whole circumference of the tip part 1, which has an airfoil-like cross-section. The slanted face 7 ramps down at the outside of the shell 2 to the end of the shell 2. This first connection interface 6 is used for firmly connecting the tip part 1 to the body part.

Furthermore, FIG. 1 shows a mold 8 used for building the body part, which extends from the root section to the connection end for connecting the body part to the tip part 1.

A lower mold half 9 is used for accommodating blade building elements 10. First blade building elements 10 in form of fiber plies or fiber laminates 11 are arranged in the mold half 9 completely lining the mold half 9, as FIG. 1 shows. The part of the stacked fiber plies or laminates 11 arranged in the lower mold half 9 builds the lower part of the shell of the body part. As FIG. 1 shows, the fiber plies or laminates 11 extend to the side of the mold half 9. The extending part is, as will be described below, afterwards flipped over to the other side for covering the arrangement and for building the upper shell part of the finally resin infused body part.

As FIG. 1 also shows, the multi-layered fiber plies or fiber laminates 11 are arranged such that a second connection interface 12 is realized at the connection end, where the tip part 1 is to be connected. This second connection interface 12 is also realized by a slanted face 13 or slanted area, which is provided by the staggered or scaled arrangement of the stacked web or laminate layers. It is also ramped, just like the already resin-embedded slanted face 7 of the tip part 1, so that both connection interfaces 6, 12 correspond in their geometry and a kind of form-fit connection is realized.

The part of the webs or laminates 11, which are arranged in the lower half shell 9, builds a first part 14 of the second connection interface 12, while the part of the webs or laminates 11 which extends to the side and which is finally flapped to the other side builds the second part 15 of the second connection interface 12.

After arranging the webs or laminates 11, which may be glass fiber plies or laminates or carbon fiber plies or laminates or a combination thereof, several further building elements 10 in form of at least one web 16 and at least one beam 17 like a core or the like is arranged in the lower mold half 9. The web 16 is finally connected to the web 3 of the tip part 1, while the beam 17 is connected to the beam 4 of the tip part 1. Although not shown, it is possible, that also the ends of the webs 3 and 16 and of the beams 4 and 17 have slanted faces, so that they are also part of the first and second connection interface 6, 12, and are also firmly fixed to each other.

After arranging the further building elements 10, the pre-fabricated tip part 1 is arranged and positioned at the mold 8 respectively the lower mold half 9. It is placed on respective support elements 18, which are respective pneumatic or hydraulic cylinders 19 and which carry, in pairs, respective support beams 20 corresponding to the shape of the tip part 1. The tip part 1 is placed on the support elements 18, which may be lowered or lifted in order to align the tip part 1 correctly to the lower mold half 9. When it is finally positioned, the lower side of the slanted face 7, i.e., of the first connection interface 6 lies on the first part 14 of the second connection interface 12, they overlap and provide a first part of a scarf joint. The fiber plies or fiber laminate layers 11 still extend to the side of the lower mold half 9.

Figure 3:
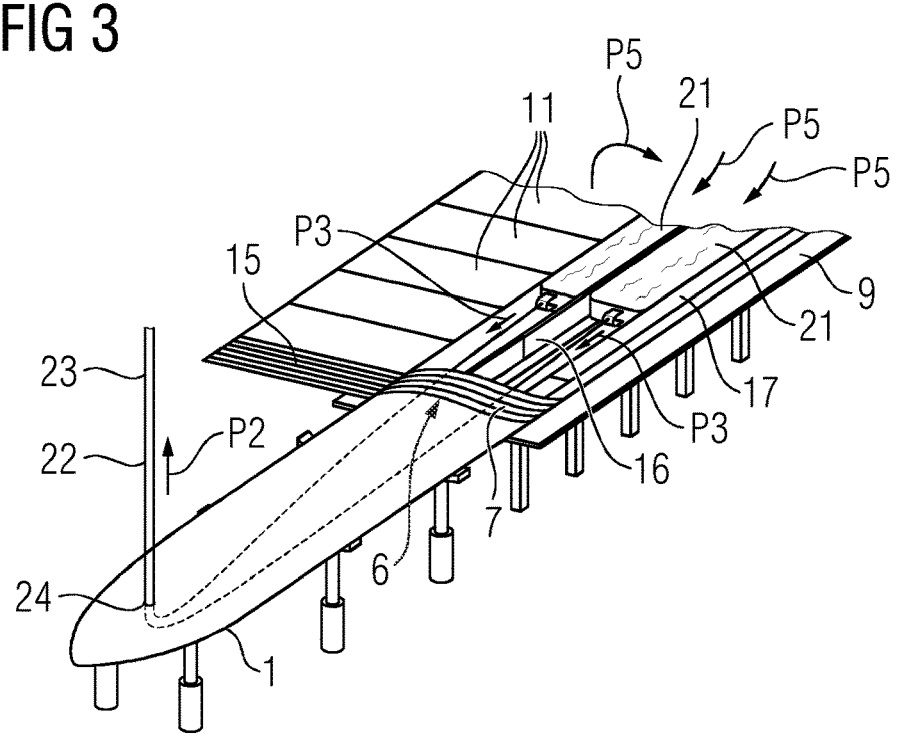
FIG. 3 shows another step of the first method alternative where the separate building elements of the blade body are arranged in the mold and a resin infusion is performed.

In the next step, as shown in FIG. 3, two mandrels 21 are arranged on the lower half shell 9. Each mandrel 21 is an inflatable bag, which is used for avoiding any resin flow into the inner of the finally produced blade, which shall still be hollow, and which mandrels are also used for holding the web 16 and the beam 17 in place and for providing a support for the webs or laminates 11, which are, as mentioned, finally flapped back for covering the whole arrangement.

As shown, both mandrels 21 are connected to a pulling means or a puller 22 in from of respective ropes or cables 23, which are guided through the lower mold half 9 and the pre-fabricated tip part 1 and which leave the tip part 1 through a bore 24, as shown in FIG. 3. For pulling the mandrels 21 also into the tip part 1, the pulling means or the puller 22 is pulled, see the arrow P1, so that the mandrels 21 are pulled as shown by the arrows P2. Finally, see FIG. 4, they extend into the tip part 1. The pulling means or the puller 22 is certainly removed, when the blade 1 is finally built.

Figure 4:
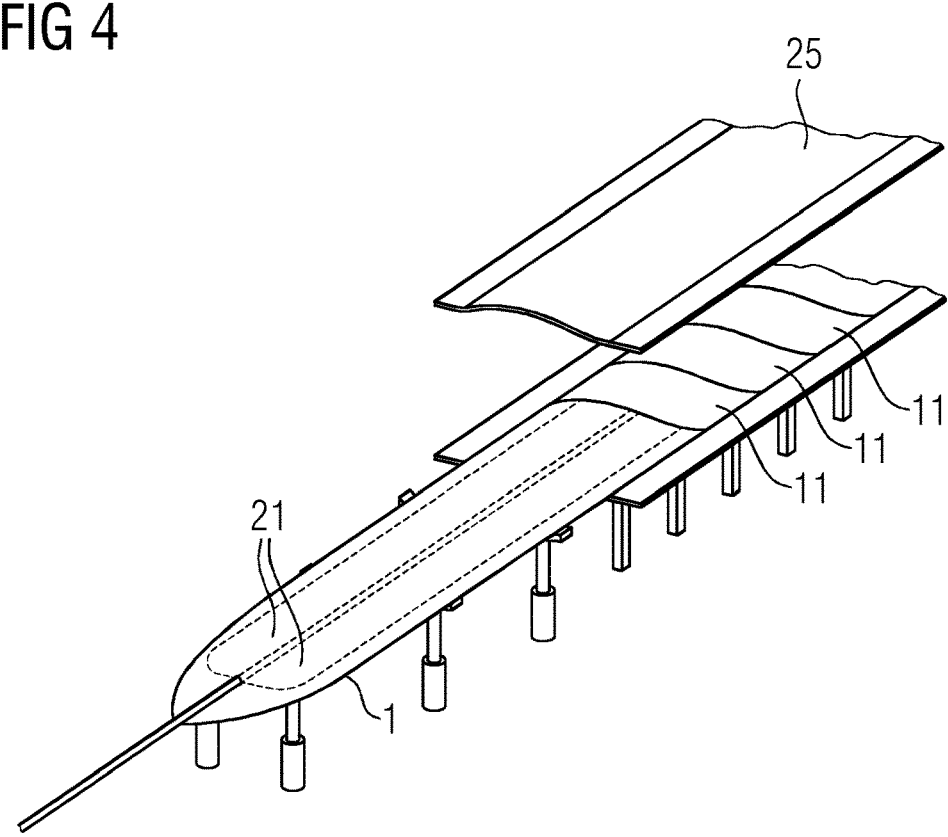
FIG. 4 shows another step of the first method alternative where the separate building elements of the blade body are arranged in the mold and a resin infusion is performed.

When the mandrels are in place, they are inflated, see the arrows P3, for filling the inner space and for providing a fixing means or a fixer for the web 16 and the beam 17 and for the fiber plies or laminates 11, which are, see FIG. 4, then flapped over the arrangement of the web 16 and the beam 17 and the inflated mandrels 21 and cover them. The flapped plies or laminates 11 build the upper shell part, which is resin infused for building the outer shell of the body part.

When flapping the plies or laminates 11, as shown by the arrow P4 in FIG. 3, also the second part 15 of the second connection interface is flapped over the slanted face 7 of the first connection interface 6, as is obvious from FIGS. 3 and 4. Now, both connection interfaces 6 and 12 are aligned and overlap each other, with both having respective slanted faces or areas, which provide a smooth transition and a scarf joint.

As FIG. 4 shows, finally the upper mold half 25 is placed on top of the arrangement covering the plies or laminates 11. Now, the arrangement is evacuated, and, as known, liquid resin is infused in a one-shot process. The liquid resin wets or embeds all building elements 10, i.e. all plies and laminates and fixes the web 16 and the beam 17 in the respective resin matrix, as it also connects the webs 3 and 16 and the beams 4 and 17 together. Especially the resin also embeds and connects both connection interfaces 6, 12, as it also flows in this connection area.

Finally, when the resin is cured, the blade is a single piece having a shell extending from the root to the final tip, with the web and the beam extending through the whole blade.

Figure 5:
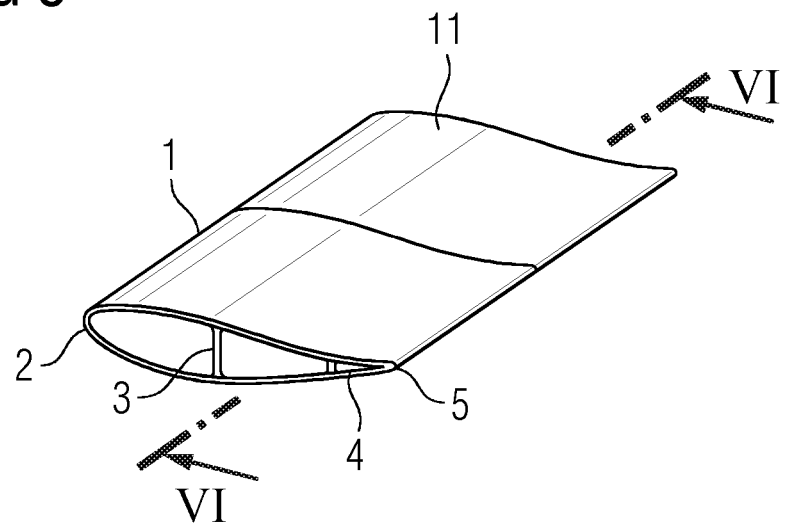
FIG. 5 shows an enlarged section of the connection zone of the tip part to the body part.

FIG. 5 shows a part of the arrangement of FIG. 4, with a cutout of the tip part 1 showing the shell 2, the web 3 and the beam 4. Wrapped around the first connection interface 6 are the fiber plies or fiber laminates 11, which arrangement is shown in more detail in FIG. 6.

Figure 6:
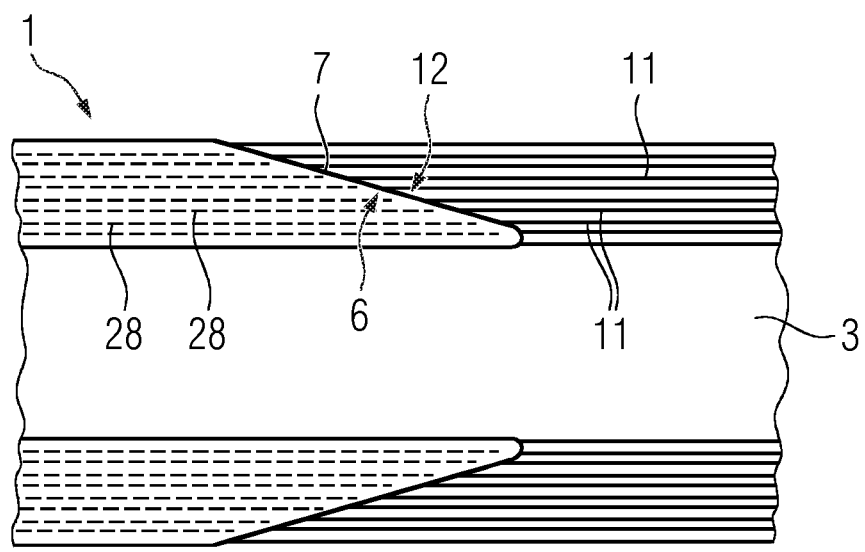
FIG. 6 shows a cross-section in the direction VI-VI of FIG. 5 showing the connection area with the first and second connection interface.

FIG. 6 shows a cross-section along the line VI-VI of FIG. 5. It shows the shell 2 of the tip part 1 with the laminate and resin-made connection interface 6 in form of the slanted face 7. It ramps down, seen in the direction from the tip to the root, along its outer shell side. Corresponding to this ramp geometry, the multi-layer arrangement comprising the stacked fiber plies or laminates 11 is also stacked or staggered for ramping it correspondingly and for building the second connection interface 12 with the respective slanted face 13. FIG. 6 clearly shows the setup in the connection or transition area before the resin infusion is realized. In the final blade, all single web or laminate layers are embedded in the resin matrix, which then connects to the shell 2 of the tip part 1, which shell 2 also comprises stacked fiber plies or laminates, as shown by the dashed lines 28 of FIG. 6.

This inventive alternative allows for changing the design of the final blade during its development. The mold 8 is a standardized mold, which allows for the production of standardized blade body parts. Each blade of a blade system having various blade lengths has the same body part, which is produced on the mold 8. As the tip part 1 is produced separately, its design, especially its length, can easily be changed due to development changes. For each separate tip part 1 a specific, but smaller and simpler mold is produced. So, it is possible to adapt the overall blade design or to customize the blade design to the specific needs on site, as only the specific tip needs to be adapted, but not the main body part.

FIG. 7 shows a second embodiment of a method alternative. For corresponding items corresponding reference numbers are used.

Also here, a pre-fabricated tip 1 is used, having a shell 2 with a not shown web 3 and a beam 4. It is also provided with a first connection interface 6 having a surrounding slanting face 7, just like the tip part 1 of the previous embodiment.

Again, a mold 8 is used, in or on which the respective body part building elements 10 are arranged. These building elements 10 comprise two pre-fabricated body part half shells, i.e. a first body part half shell 26 and a second body part half shell 27. Both are pre-fabricated, for which respective molds or mold halves are used, in which all building elements, i.e. all fiber plies or laminates are arranged and resin-infused and cured, so that each half shell is a stable workable item.

The first body part half shell 26 is arranged in the mold 8, which may be a lower mold half 9, in which this body part half shell 26 may be produced. It comprises a first part 14 of the second connection interface 12, as shown in FIG. 7. Also, this first part 14 is slanted and realized by the stacked plies embedded in the resin matrix.

The second body part half shell 27 comprises a second part 15 of the second connection interface 12, which is, also shown by the respective lines, a slanted face. When both half shells 26, 27 are arranged above each other, the first and second part 14, 15 build the complete second connection interface extending around the inner circumference of the shell arrangement.

After placing the first body part half shell 26 in the mold 8 or the lower mold part 9, or after producing it there, the tip part 1 is arranged correspondingly to the way of FIG. 1, while in FIG. 7 the respective support elements 18 etc. are not shown in detail. It is arranged such, that the lower side of the slanted face 7 rests and overlaps the first part 14 of the second connection interface 12. This arrangement or positioning is shown by the arrow P1.

Afterwards, the second body part half shell 27 is placed on the arrangement, as shown by the arrow P6. It covers the first half shell 26, in which, although not shown, the web 16 and the beam 17 etc. are arranged and aligned to the also not shown web 3 and beam 4 of the tip part 1. The second part 15 of the second connection interface 12 covers or connects to the upper part of the slanted face 7 of the first connection interface 6.

For firmly fixing all elements, a glue is used, which is applied to the respective connection surfaces, i.e. the surfaces extending along the half shell 26, 27 and the respective webs or beams etc., and along the respective first and second connection interfaces 6, 12. Certainly, the glue is applied to the respective surface at the appropriate time. For example, a glue is provided to the first part 14 and the lower side of the slanted face 7, before the tip part 1 is put in place. The glue is then provided to the connection surfaces of both half shells 26, 27 and the webs etc., and the second part 15 and the upper side of the slanted face 7, before the second half shell 27 is put in place.

When the glue is finally cured, a single blade is built, which can also be simply adjusted in its length, as also here the blade body part, built by the respective half shells 26, 27, has a standardized geometry, shape and length, while the pre-fabricated tip 1 can be individualized according to its needs.

Finally, FIG. 8 shows a third alternative, again with the pre-fabricated tip 1 having a shell 2 with not shown webs or beams etc. It also comprises a first connection interface 6 having a slanted face 7 as the previous embodiments.

In this embodiment, again, a first and a second half shell 26, 27 are used. Here, both half shells 26, 27 are glued together before the tip 1 is attached. Therefore, the glue is applied to both half shells 26, 27 and the second half shell 27 is placed on the first half shell 26. Again, the respective first and second parts 14, 15 for the second connection interface 12 having a surrounding slanted connection face, which corresponds in its form to the slanted face 7 of the first connection interface 6. Now, after the half shells 26, 27 are glued together, and after the glue is cured, a glue is also provided on the respective first and second connection interfaces 6, 12, and the tip 1 is arranged and pushed into the hollow body part built by both half shells 26, 27. The ramped first connection interface 6 is inserted in the also ramped second connection interface 12, so that they overlap. They are firmly fixed together by the glue, which is then cured.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for producing a wind turbine blade having a blade body comprising a body part and a tip part, the method comprising:
   arranging a prefabricated tip part having a first connection interface adjacent to a mold;
   arranging building elements for building the body part in the mold and providing a second connection interface which corresponds to and connects to the first connection interface; and
   fixing both connection interfaces by applying and curing a fixing agent;
   wherein the building elements of the body part are arranged in the mold and are infused with a resin used as the fixing agent and are embedded in a resulting resin matrix together with both connection interfaces after curing the resin.

2. The method according to claim 1, wherein both connection interfaces comprise slanted connection faces for realizing a scarf joint, and wherein the connection interfaces overlap.

3. The method according to claim 2, wherein the slanted faces are provided at a shell of the tip part and by at least some of the building elements building a shell of the body part.

4. The method according to claim 3, wherein additional slanted faces are provided at at least one longitudinal web or beam provided in the tip part and at at least one longitudinal web or beam provided in the body part.

5. The method according to claim 1, further comprising:
   arranging building elements in form of fiber plies or laminates for building a body part shell in a lower mold half such that they provide a first part of the second connection interface;
   arranging the tip part such that it connects with at least a part of its first connection interface to the first part of the second connection interface;
   arranging further building elements in the mold half;
   arranging the fiber plies or laminates for building the body part shell such that they cover the further building elements and provide a second part of the second connection interface connecting to a further part of the first connection interface;
   closing the mold by placing an upper mold half on the lower mold half; and
   applying a liquid resin as the fixing agent for embedding at least the shell building elements and the first and second connection interfaces in the resin and curing the resin.

6. The method according to claim 5, wherein at least one mandrel is arranged as a building element of the building elements and pulled from the body part into the tip part and inflated before the fiber plies or laminates are arranged for covering the further building elements.

7. The method according to claim 6, wherein a puller connected to the at least one mandrel is guided through the tip part and a bore in the tip part to the outside of the tip part, which puller is pulled through the bore for pulling the mandrel in the tip part.

8. The method according to claim 7, wherein a rope or chain is used as a puller.

* * * * *